(12) United States Patent
Childers

(10) Patent No.: US 7,358,930 B2
(45) Date of Patent: *Apr. 15, 2008

(54) DISPLAY SYSTEM WITH SCROLLING COLOR AND WOBBLE DEVICE

(75) Inventor: Winthrop D. Childers, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 568 days.

This patent is subject to a terminal disclaimer.

(21) Appl. No.: 10/686,110

(22) Filed: Oct. 14, 2003

(65) Prior Publication Data

US 2005/0078056 A1   Apr. 14, 2005

(51) Int. Cl.
   *G09G 3/00*   (2006.01)
(52) U.S. Cl. .............................. 345/32; 345/88; 353/30; 348/742
(58) Field of Classification Search .................. 345/32, 345/87, 697, 88; 353/30, 84; 348/742–744
   See application file for complete search history.

(56) References Cited

U.S. PATENT DOCUMENTS

| 5,410,370 | A | 4/1995 | Janssen |
| 5,706,061 | A | 1/1998 | Marshall et al. |
| 5,774,196 | A | 6/1998 | Marshall |
| 6,002,452 | A | 12/1999 | Morgan |
| 6,591,022 | B2 | 7/2003 | Dewald |
| 6,771,325 | B1 * | 8/2004 | Dewald et al. ............. 348/743 |
| 6,828,961 | B2 * | 12/2004 | Elliott et al. ................. 345/213 |
| 2002/0008812 | A1 | 1/2002 | Conner et al. |
| 2002/0135662 | A1 | 9/2002 | Dewald |
| 2003/0090597 | A1 * | 5/2003 | Katoh et al. ................. 348/744 |

OTHER PUBLICATIONS

Tokita, T et al "FLC Resolution—Enhancing Device for Projection Displays", 2002 SID Int'l Symp Digest of Tech Papers, San Jose, CA.

* cited by examiner

Primary Examiner—Regina Liang

(57) ABSTRACT

A display system for displaying an image based upon image data includes an image processing unit configured to define a plurality of sub-frame images including a first sub-frame image and at least a second sub-frame image based upon the image data; a scrolling color device configured to generate a scrolling color light beam comprising a plurality of colors; a spatial light modulator disposed to receive and modulate the scrolling color light beam based upon the plurality of sub-frame images; and a wobbling device configured to cause the sub-frame images to be displayed in an alternating manner such that said first sub-frame image is spatially offset from said second sub-frame image.

25 Claims, 14 Drawing Sheets

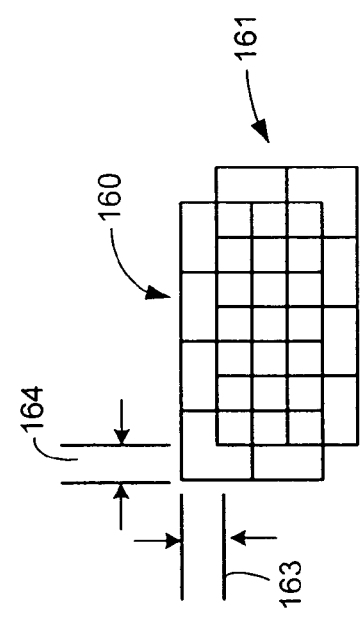
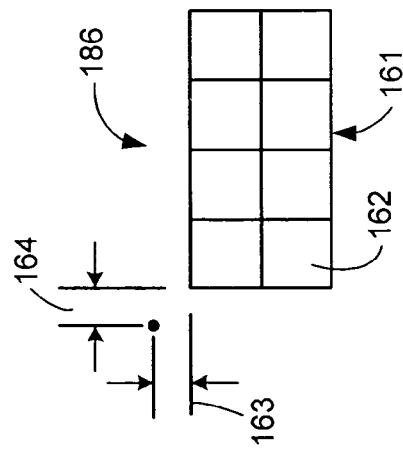
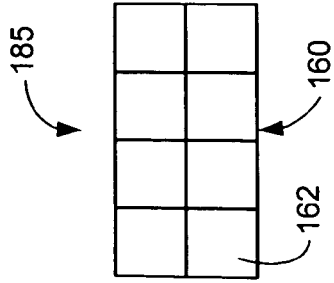

DISPLAY SYSTEM WITH SCROLLING COLOR AND WOBBLE DEVICE

BACKGROUND

A conventional system or device for displaying an image, such as a display, projector, or other imaging system, is frequently used to display a still or video image. Viewers evaluate display systems based on many criteria such as image size, contrast ratio, color purity, brightness, pixel color accuracy, and resolution. Image brightness, pixel color accuracy, and resolution are particularly important metrics in many display markets because the available brightness, pixel color accuracy, and resolution can limit the size of a displayed image and control how well the image can be seen in venues having high levels of ambient light.

A conventional display system produces a displayed image by addressing an array of pixels arranged in horizontal rows and vertical columns. Because pixels have a rectangular shape, it can be difficult to represent a diagonal or curved edge of an object in a image that is to be displayed without giving that edge a stair-stepped or jagged appearance. Furthermore, if one or more of the pixels of the display system is defective, the displayed image will be effected by the defect. For example, if a pixel of the display system exhibits only an "off" position, the pixel may produce a solid black square in the displayed image. The undesirable results of pixel geometry and pixel inaccuracy are accentuated when the displayed image is projected onto a large viewing surface in color.

Many display systems create a full color display with a single modulator by creating three or more modulated images in primary colors (red, green, and blue) per video frame. The primary colors are typically derived from a white light source using a color wheel, prism, or some other color filter. The modulated images are sequentially displayed at a high rate so as to create a full color image in the human visual system. Thus, this method of generating a full color display is called "sequential color." Although the use of sequential color yields the desired red, green, and blue light for image formation, it does so by blocking the transmission of undesired light wavelengths. In other words, a significant portion of the light emitted by the light source is wasted, resulting in a decreased brightness of the final displayed image.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

FIGS. 6A-C illustrate that a number of image sub-frames may be generated for a particular image according to one exemplary embodiment.

Throughout the drawings, identical reference numbers designate similar, but not necessarily identical, elements.

DETAILED DESCRIPTION

A recently developed technology that improves the brightness of an image generated by a display system is called "scrolling color." In a scrolling color display system, all the primary colors are present on the modulator at the same time. Thus, the waste of light caused by sequential color is avoided. A display system configured to enhance an image's apparent resolution and hide pixel inaccuracies while using scrolling color is described herein.

In the following description, for purposes of explanation, numerous specific details are set forth in order to provide a thorough understanding of the present display system. It will be apparent, however, to one skilled in the art that the present display system may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

The term "display system" will be used herein and in the appended claims, unless otherwise specifically denoted, to refer to a projector, projection system, image display system, television system, video monitor, computer monitor system, or any other system configured to display an image. The image may be a still image, a series of images, or motion picture video. The term "image" will be used herein and in the appended claims, unless otherwise specifically denoted, to refer broadly to a still image, series of images, motion picture video, or anything else that is displayed by a display system.

Figure 1:
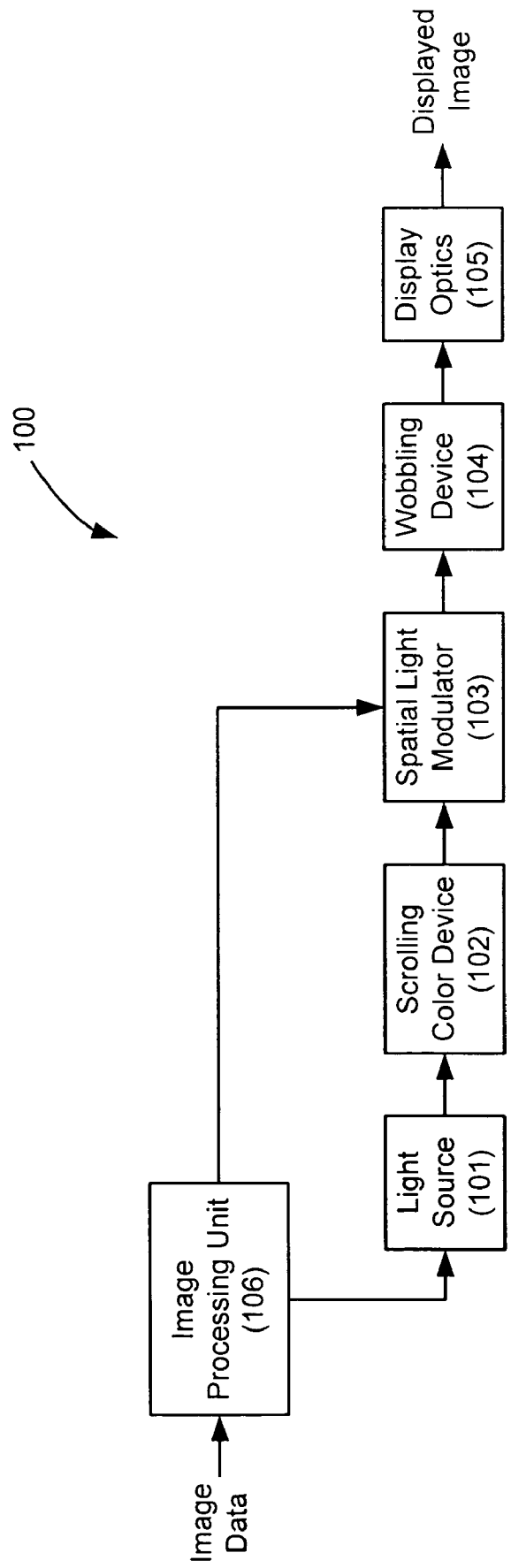
FIG. 1 illustrates an exemplary display system according to one exemplary embodiment.

FIG. 1 illustrates an exemplary display system (100) according to an exemplary embodiment. The components of FIG. 1 are exemplary only and may be modified or changed as best serves a particular application. As shown in FIG. 1, image data is input into an image processing unit (106). The image data defines an image that is to be displayed by the display system (100). While one image is illustrated and described as being processed by the image processing unit (106), it will be understood by one skilled in the art that a plurality or series of images may be processed by the image processing unit (106). The image processing unit (106) performs various functions including controlling the illumination of a light source (101) and controlling a spatial light modulator (SLM) (103). The image processing unit (106) will be explained in more detail below.

As shown in FIG. 1, the light source (101) provides a beam of light to a scrolling color device (102). The light source (101) may be, but is not limited to, a high pressure mercury lamp or an array of light emitting diodes (LEDs). The scrolling color device (102) enables the display system (100) to display a full color image by providing different color components of the full color image. The scrolling color device (102) may include a set of rotating prisms, a color wheel, or any other device capable of scrolling color. The scrolling color device (102) may also include a light emitting diode (LED) array including diodes of different colors. In such an example, the array functions as both the light source (101) and the scrolling color device (102). The scrolling color device (102) may be any device or combination of devices that generates a scrolling color light beam that is input into the SLM (103). Scrolling color and the scrolling color device (102) will be explained in more detail below.

Light transmitted by the scrolling color device (102) is focused onto the spatial light modulator (SLM) (103) through a lens or through some other device (not shown). SLMs are devices that modulate incident light in a spatial pattern corresponding to an electrical or optical input. The terms "SLM" and "modulator" will be used interchangeably herein to refer to a spatial light modulator. The incident light may be modulated in its phase, intensity, polarization, or direction by the modulator (103). Thus, the SLM (103) of FIG. 1 modulates the light output by the scrolling color device (102) based on input from the image processing unit (106) to form an image bearing beam of light that is eventually displayed or cast by display optics (105) on a viewing surface (not shown). The display optics (105) may comprise any device configured to display or project an image. For example, the display optics (105) may be, but are not limited to, a lens configured to project and focus an image onto a viewing surface. The viewing surface may be, but is not limited to, a screen, television, wall, liquid crystal display (LCD), or computer monitor.

The SLM (103) may be, but is not limited to, a liquid crystal on silicon (LCOS) array or a micromirror array. LCOS and micromirror arrays are known in the art and will not be explained in detail in the present specification. An exemplary, but not exclusive, LCOS array is the Philips™ LCOS modulator. An exemplary, but not exclusive, micromirror array is the Digital Light Processing (DLP) chip available from Texas Instruments™ Inc.

Returning to FIG. 1, before the display optics (105) display the image, the modulated light may be passed through a "wobbling" device (104), according to an exemplary embodiment. A wobbling device, as will be described in detail below, is a device that is configured to enhance image resolution and hide pixel inaccuracies. An exemplary, but not exclusive, wobbling device (104) is a galvanometer mirror. The wobbling device (104) may be integrated into the SLM (103) or other component of the display system (100) in alternative embodiments.

Figure 2:
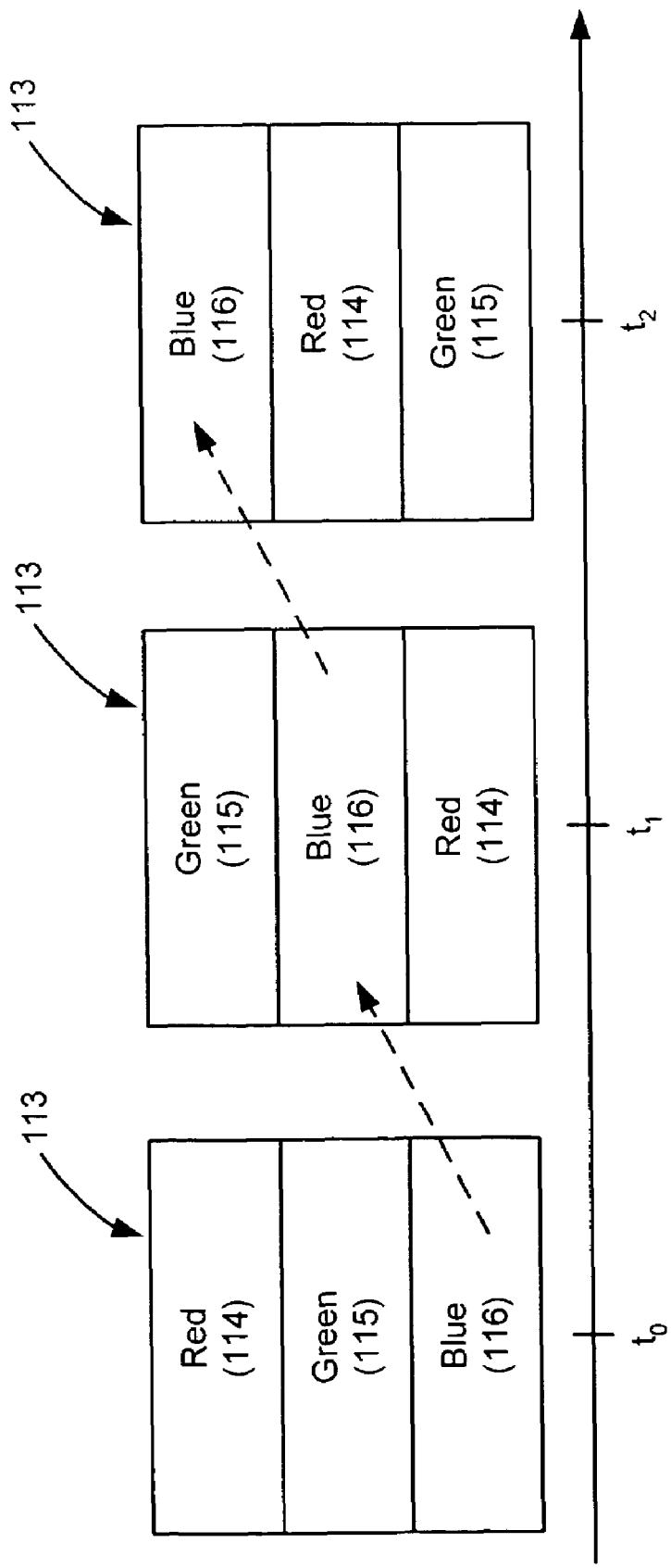
FIG. 2 illustrates scrolling color across the face of a modulator according to one exemplary embodiment.

FIG. 2 will be used to illustrate scrolling color across a face of a modulator. As previously mentioned, scrolling color increases the brightness of a displayed image by allowing all the primary colors to be present on the modulator at the same time. FIG. 2 shows the image of red (114), green (115), and blue (116) segments of light moving, or scrolling, across the face (113) of a modulator. The modulator face (113) may comprise an array of controllable pixel elements, according to an exemplary embodiment. The modulator face (113) may be, but is not limited to, a LCOS panel or the surface of a micromirror array, for example. The scrolling of the colors is performed by the scrolling color device (102; FIG. 1). At time $t_0$, the blue segment (116) occupies the bottom third portion of the modulator face (113), the green segment (115) occupies the middle third portion of the modulator face (113), and the red segment (114) occupies the top third portion of the modulator face (113), as shown in FIG. 2. The colors then scroll up and at time $t_1$, the blue segment (116) now occupies the middle third portion of the modulator face (113), the green segment (115) occupies the top third portion of the modulator face (113), and the red segment (114) occupies the bottom third portion of the modulator face (113). FIG. 2 also shows the position of the color segments at time $t_2$ after they have scrolled one more time. FIG. 2 shows two dotted lines to illustrate the movement of the blue color segment (116) between times $t_0$ and $t_2$. Although FIG. 2 shows that the colors scroll up from the bottom of the face (113) of a modulator, it will be understood that the colors may scroll in any direction across the modulator face. For example, the colors may scroll from top to bottom, right to left, left to right, or at an angle across the modulator face (113). Furthermore, although the color segments of FIG. 2 are shown to be rectangular in shape, it will be recognized by one skilled in the art that the color segments may be curved or of any other shape.

Since each of the primary colors appears on a different region of the face (113) of the modulator at any given time, all three primary colors are applied to the image data that is provided by the image processing unit (106) to the modulator (103). For example, while one region of the modulator face (113) is operated using red data, other regions of the modulator face (113) are operated using green and blue data. Thus, in an ideal scrolling color display system, no light is wasted and the potential brightness of the display is raised.

FIG. 2 shows that the primary colors are all present on the modulator face (113) for explanatory purposes only. In an alternative embodiment, more or less colors than just the primary colors may be present on the modulator at the same time. For example, the scrolling color device (102; FIG. 1) may break the light emitted from the light source (101; FIG. 1) into red, green, blue, yellow, and cyan colors and scroll all five of these colors across the modulator face (113; FIG. 2) such that all five colors are present on the modulator face (113; FIG. 2) at one time. The number of colors used in a scrolling color display system will vary as best serves a particular application.

Figure 3:
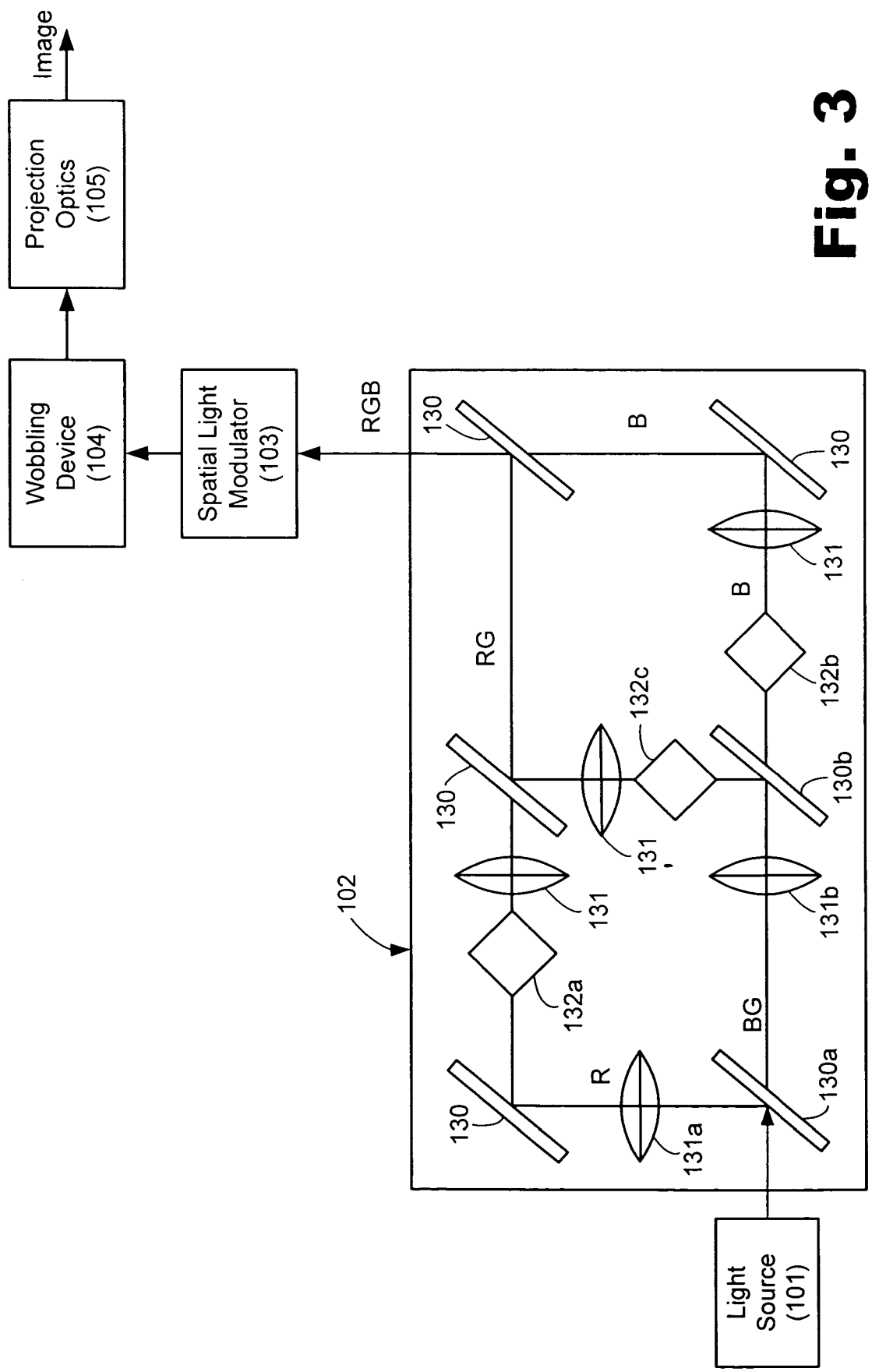
FIG. 3 illustrates an exemplary scrolling color device according to one exemplary embodiment.

FIG. 3 illustrates an exemplary scrolling color device (102), according to an exemplary embodiment. The scrolling color device (102) of FIG. 3 is one of many different scrolling color devices that may be used to effectuate scrolling color in a display system. The scrolling color device (102) in FIG. 3 uses a spinning prism engine to scroll the color across the face of a modulator.

As shown in FIG. 3, light emitted from the light source (101) enters the scrolling color device (102) and is passed through a mirror (130a). The mirror (130a) acts as a filter device and filters one of the primary colors from the light. For example, in FIG. 3, the mirror (130a) filters the red portion from the light and sends the red light through a relay lens (131a). The blue-green portion of the light is sent through another relay lens (131b) to a second filter mirror (130b). The mirror (130b) filters separates the green light from the blue light. The scrolling color device (102) of FIG. 3 also comprises three scanning prisms (132a,b,c). Each scanning prism is associated with one of the three colors. The scanning prisms (132a,b,c) are configured to rotate so as to scroll each of the colors across the face of the modulator (103). As shown in FIG. 3, additional mirrors (130) and relay lenses (131) are used to direct and focus different colors of light.

Figure 4:
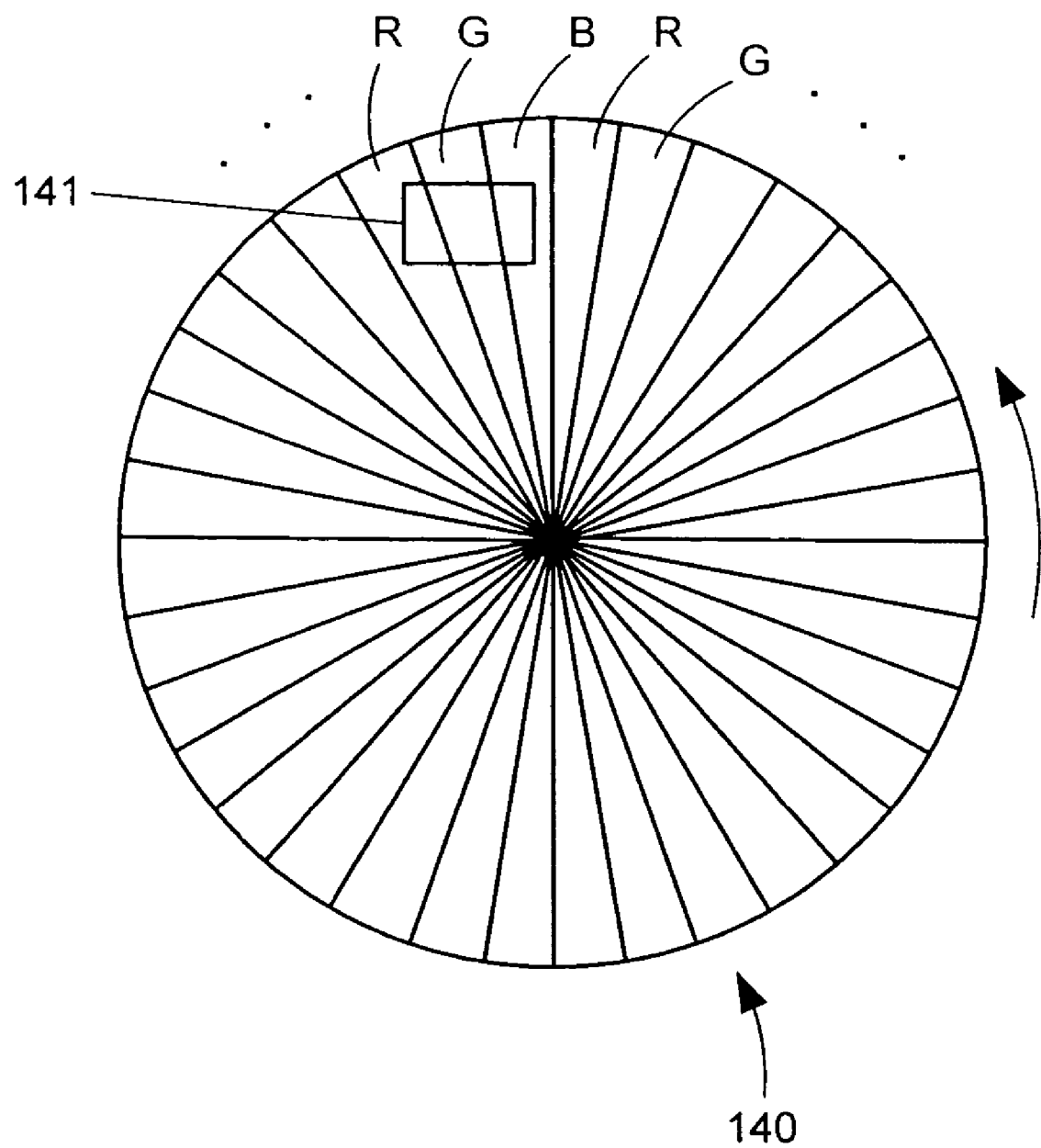
FIG. 4 illustrates an exemplary "pinwheel" style color filter wheel according to one exemplary embodiment.

Another scrolling color device that may be used to implement scrolling color in a display system is a "pinwheel" style color filter wheel, as shown in FIG. 4. The color filter wheel (140) comprises a number of filter segments. As shown, a beam of light (141) may be focused on the color wheel such that a filter segment corresponding to each color in the color filter wheel (140) is covered by the beam of light (141). Each filter segment allows one primary color to pass through the segment. The color wheel rotates so as to scroll each of the colors across the face of the modulator (103; FIG. 3). The exemplary color filter wheel (140) of FIG. 4 comprises a number of filter segments corresponding to the primary colors. The color filter wheel (140) may comprise filter segments corresponding to any number of colors, according to an exemplary embodiment.

Figure 5:
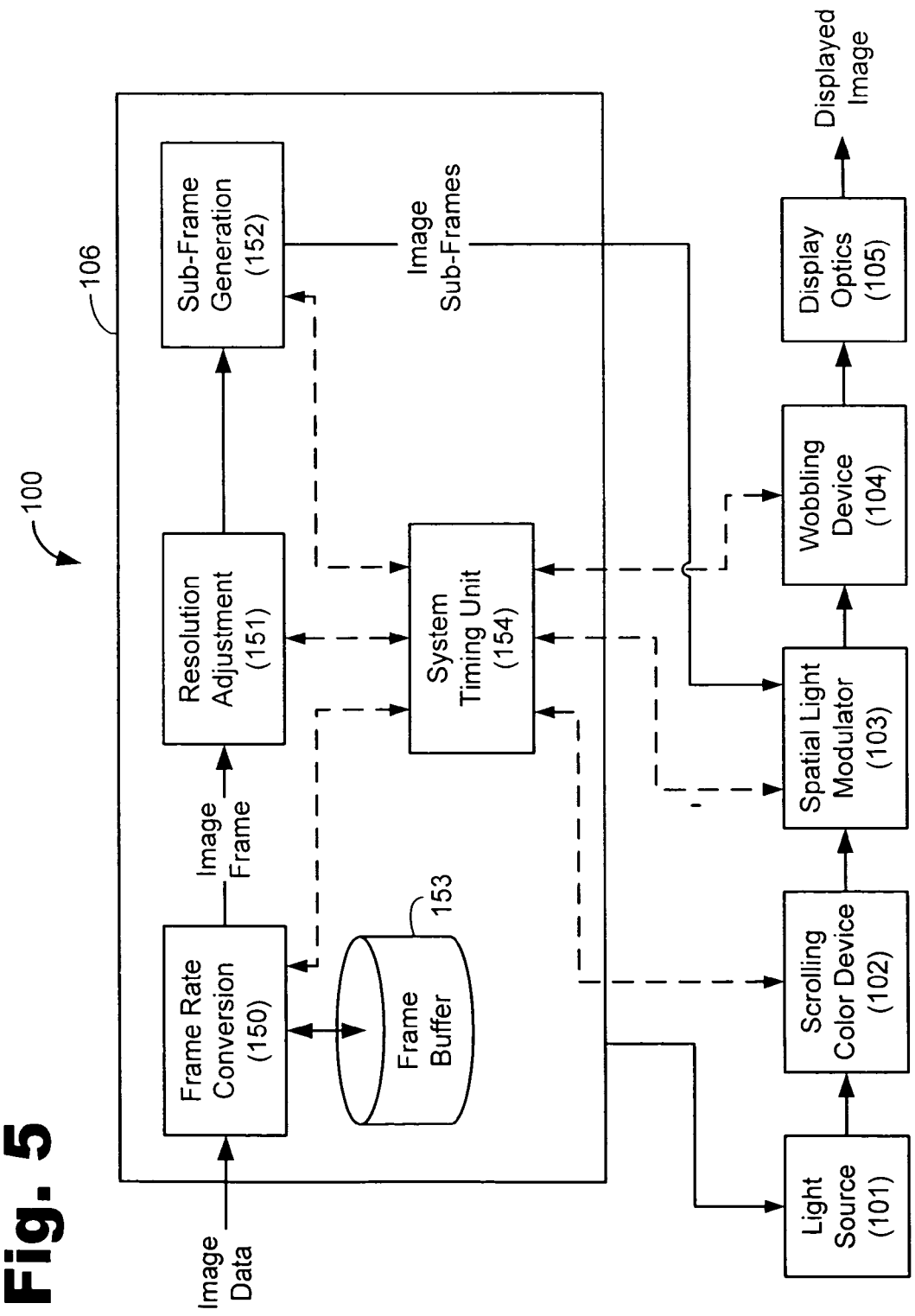
FIG. 5 illustrates an exemplary display system with an expanded view of exemplary functions inside the image processing unit according to one exemplary embodiment.

FIG. 5 illustrates the same display system (100) of FIG. 1 with an expanded view of exemplary functions inside the image processing unit (106). According to an exemplary embodiment, these functions in combination with the wobbling device (104) enhance image resolution and hide pixel inaccuracies in the displayed image.

In one embodiment, as shown in FIG. 5, the image processing unit (106) may comprise a frame rate conversion unit (150) and an image frame buffer (153). As described below, the frame rate conversion unit (150) and the image frame buffer (153) receive and buffer the image data to create an image frame corresponding to the image data. In addition, the image processing unit (106) may further comprise a resolution adjustment function (151), a sub-frame generation function (152), and a system timing unit (154). The resolution adjustment function (151), as will be explained below, adjusts the resolution of the frame to match the resolution capability of the display system (100). The sub-frame generation function (152) processes the image frame data to define one or more image sub-frames corresponding to the image frame. The sub-frames, as will be explained below, are displayed by the display system (100) to produce a displayed image. The system timing unit (154), as will also be explained below, synchronizes the timing of the various components of the display system (100).

The image processing unit (106), including the frame rate conversion unit (150), the resolution adjustment function (151), the sub-frame generation function (152), and/or the system timing unit (154), includes hardware, software, firmware, or a combination of these. In one embodiment, one or more components of the image processing unit (106) are included in a computer, computer server, or other microprocessor-based system capable of performing a sequence of logic operations. In addition, the image processing may be distributed throughout the display system (100) with individual portions of the image processing unit (106) being implemented in separate system components. The image processing unit (106) may also comprise any electronics configured to generate a plurality of image sub-frames.

According to one embodiment, the image data may comprise digital image data, analog image data, or a combination of analog and digital data. The image processing unit (106) may be configured to receive and process digital image data and/or analog image data.

The frame rate conversion unit (150) receives the image data corresponding to an image that is to be displayed by the display system (100) and buffers or stores the image data in the image frame buffer (153). More specifically, the frame rate conversion unit (150) receives image data representing individual lines or fields of the image and buffers the image data in the image frame buffer (153) to create an image frame that corresponds to the image that is to be displayed by the display system (100). The image frame buffer (153) may buffer the image data by receiving and storing all of the image data corresponding to the image frame and the frame rate conversion unit (150) may generate the image frame by subsequently retrieving or extracting all of the image data for the image frame from the image frame buffer (153). As such, the image frame is defined to comprise a plurality of individual lines or fields of image data representing an entirety of the image that is to be displayed by the display system (100). Thus, the image frame includes a plurality of columns and a plurality of rows of individual pixels representing the image that is to be displayed by the display system (100).

The frame rate conversion unit (150) and the image frame buffer (153) can receive and process image data as progressive image data and/or interlaced image data. With progressive image data, the frame rate conversion unit (150) and the image frame buffer (153) receive and store sequential fields of image data for the image. Thus, the frame rate conversion unit (150) creates the image frame by retrieving the sequential fields of the image data for the image. With interlaced image data, the frame rate conversion unit (150) and the image frame buffer (153) receive and store the odd fields and the even fields of the image data for the image. For example, all of the odd fields of the image data are received and stored and all of the even fields of the image data are received and stored. As such, the frame rate conversion unit (150) de-interlaces the image data and creates the image frame by retrieving the odd and even fields of the image data for the image.

The image frame buffer (153) includes memory for storing the image data for one or more image frames of respective images. For example, the image frame buffer (153) may comprise non-volatile memory such as a hard disk drive or other persistent storage device or include volatile memory such as random access memory (RAM).

By receiving the image data at the frame rate conversion unit (150) and buffering the image data in the image frame buffer (153), the input timing of the image data can be decoupled from timing requirements of the remaining components in the display system (100) (e.g.; the SLM (103), the wobbling device (104), and the display optics (105)). More specifically, since the image data for the image frame is received and stored by the image frame buffer (153), the image data may be received at any input rate. As such, the frame rate of the image frame may be converted to the timing requirement of the remaining components in the display system (100). For example, the image data for the image frame may be extracted from the image frame buffer (153) at a frame rate equal to the frame rate of the SLM (103).

In one embodiment, the image processing unit (106) may include a resolution adjustment function (151) and a sub-frame generation unit (152). As described below, the resolution adjustment function (151) receives image data for an image frame and adjusts a resolution of the image data. More specifically, the image processing unit (106) receives image data for the image frame at an original resolution and processes the image data to match the resolution that the display system (100) is configured to display. In an exemplary embodiment, the image processing unit (106) increases, decreases, and/or leaves unaltered the resolution of the image data so as to match the resolution that the display system (100) is configured to display.

In one embodiment, the sub-frame generation unit (152) receives and processes image data for an image frame and defines a number of image sub-frames corresponding to the image frame. If the resolution adjustment unit (151) has adjusted the resolution of the image data, the sub-frame generation unit (152) receives the image data at the adjusted resolution. Each of the image sub-frames comprises a data array or matrix that represents a subset of the image data corresponding to the image that is to be displayed. The data arrays comprise pixel data defining the content of pixels in a pixel area equal to the pixel area of the corresponding image frame. Thus, each image sub-frame defines a sub-frame image that is displayed during a sub-frame time period, as will be explained below. Because, as will be explained below, each image sub-frame is displayed in spatially different image sub-frame locations, each of the image sub-frames' data arrays comprise slightly different pixel data. In one embodiment, the image processing unit (106) may only generate image sub-frames corresponding to an image that is to be displayed as opposed to generating both an image frame and corresponding image sub-frames. The image sub-frames will now be explained in more detail.

As mentioned, each image sub-frame in a group of image sub-frames corresponding to an image frame comprises a matrix or array of pixel data corresponding to an image to be displayed. In one embodiment, each image sub-frame is input to the SLM (103). The SLM (103) modulates a light beam in accordance with the sub-frames and generates a light beam bearing the sub-frames. The light beam bearing the individual image sub-frames is eventually displayed by the display optics (105) to create a displayed image. However, after light corresponding to each image sub-frame in a group of sub-frames is modulated by the SLM (103) and before each image sub-frame is displayed by the display optics (105), the wobbling device (104) shifts the position of the light path between the SLM (103) and the display optics (105). In other words, the wobbling device shifts the pixels such that each image sub-frame is displayed by the display optics (105) in a slightly different spatial position than the previously displayed image sub-frame. Thus, because the image sub-frames corresponding to a given image are spatially offset from one another, each image sub-frame includes different pixels and/or portions of pixels. The wobbling device (104) may shift the pixels such that the image sub-frames are offset from each other by a vertical distance and/or by a horizontal distance, as will be described below.

According to an exemplary embodiment, each of the image sub-frames in a group of sub-frames corresponding to an image is displayed by the display optics (105) at a high rate such that the human eye cannot detect the rapid succession between the image sub-frames. Instead, the rapid succession of the image sub-frames appears as a single displayed image. As will now be described in detail, by sequentially displaying the image sub-frames in spatially different positions, the apparent resolution of the finally displayed image is enhanced.

FIGS. 6A-C illustrate an exemplary embodiment wherein a number of image sub-frames are generated for a particular image. As illustrated in FIGS. 6A-C, the exemplary image processing unit (106) generates two image sub-frames for a particular image. More specifically, the image processing unit (106) generates a first sub-frame (160) and a second sub-frame (161) for the image frame. Although the image sub-frames in this example and in subsequent examples are generated by the image processing unit (106), it will be understood that the image sub-frames may be generated by the sub-frame generation function (152) or by a different component of the display system (100). The first sub-frame (160) and the second sub-frame (161) each comprise a data array of a subset of the image data for the corresponding image frame. Although the exemplary image processing unit (106) generates two image sub-frames in the example of FIGS. 6A-C, it will be understood that two image sub-frames are an exemplary number of image sub-frames that may be generated by the image processing unit (106) and that any number of image sub-frames may be generated according to an exemplary embodiment.

In one embodiment, as illustrated in FIG. 6B, the first image sub-frame (160) is displayed in a first image sub-frame location (185). The second sub-frame (161) is displayed in a second image sub-frame location (186) that is offset from the first sub-frame location (185) by a vertical distance (163) and a horizontal distance (164). As such, the second sub-frame (161) is spatially offset from the first sub-frame (160) by a predetermined distance. In one illustrative embodiment, as shown in FIG. 6C, the vertical distance (163) and horizontal distance (164) are each approximately one-half of one pixel. However, the spatial offset distance between the first image sub-frame location (185) and the second image sub-frame location (186) may vary as best serves a particular application. In alternative embodiments, the first sub-frame (160) and the second sub-frame (161) may only be offset in either the vertical direction or in the horizontal direction. In the illustrated embodiment, the wobbling device (104; FIG. 5) is configured to offset the beam of light between the SLM (103; FIG. 5) and the display optics (105; FIG. 5) such that the first and second sub-frames (160, 161; FIG. 6) are spatially offset from each other both vertically and horizontally.

As illustrated in FIG. 6C, the display system (100; FIG. 5) alternates between displaying the first sub-frame (160) in the first image sub-frame location (185) and displaying the second sub-frame (161) in the second image sub-frame location (186) that is spatially offset from the first image sub-frame location (185). More specifically, the wobbling device (104; FIG. 5) shifts the display of the second sub-frame (161) relative to the display of the first sub-frame (160) by the vertical distance (163) and by the horizontal distance (164). As such, the pixels of the first sub-frame (160) overlap the pixels of the second sub-frame (161). In one embodiment, the display system (100; FIG. 5) completes one cycle of displaying the first sub-frame (160) in the first image sub-frame location (185) and displaying the second sub-frame (161) in the second image sub-frame location (186) resulting in a displayed image with an enhanced apparent resolution. Thus, the second sub-frame (161) is spatially and temporally displaced relative to the first sub-frame (160).

Figure 7B:
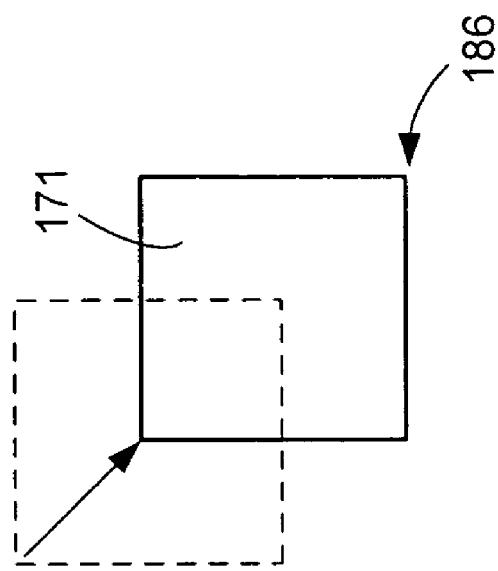
FIGS. 7A-B illustrate displaying a pixel from the first sub-frame in a first image sub-frame location and displaying a pixel from the second sub-frame in the second image sub-frame location according to one exemplary embodiment.
Figure 7A:
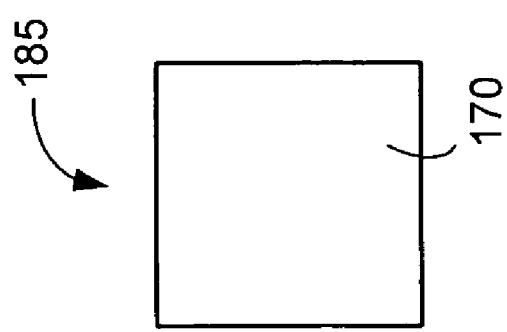
Figure 8A:
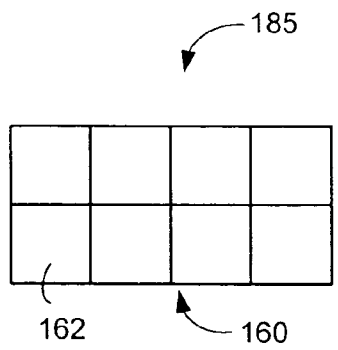
FIGS. 8A-D illustrate that the sub-frame generation function may define four image sub-frames for an image frame according to one exemplary embodiment.
Figure 8B:
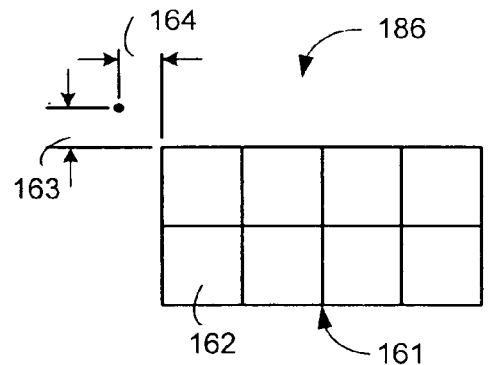
Figure 8C:
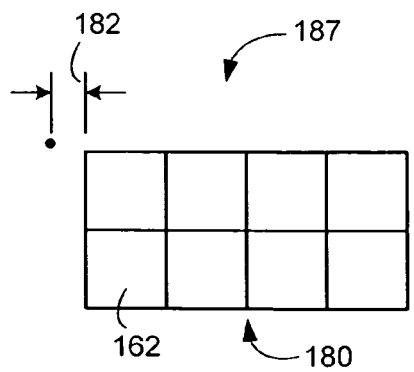
Figure 8D:
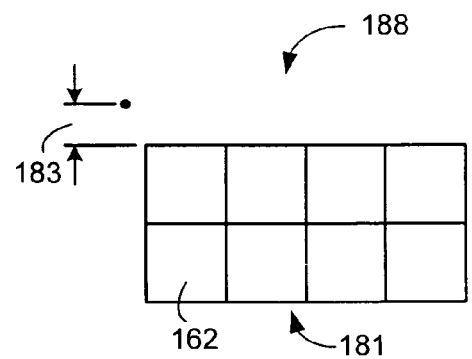

FIGS. 7A-B illustrate an exemplary embodiment of completing one cycle of displaying a pixel (170) from the first sub-frame (160) in the first image sub-frame location (185) and displaying a pixel (171) from the second sub-frame (161) in the second image sub-frame location (186). FIG. 7A illustrates the display of the pixel (170) from the first sub-frame (160) in the first image sub-frame location (185). FIG. 7B illustrates the display of the pixel (171) from the second sub-frame (161) in the second image sub-frame location (186). In FIG. 7B, the first image sub-frame location (185) is illustrated by dashed lines.

Thus, by generating a first and second sub-frame (160, 161) and displaying the two sub-frames in the spatially offset manner as illustrated in FIGS. 6A-C and FIGS. 7A-B, twice the amount of pixel data is used to create the finally displayed image as compared to the amount of pixel data used to create a finally displayed image without using the image sub-frames and wobulation. Accordingly, with two-position processing, the resolution of the finally displayed image is increased by a factor of approximately 1.4 or the square root of two.

In another embodiment, as illustrated in FIGS. 8A-D, the image processing unit (106) defines four image sub-frames for an image frame. More specifically, the image processing unit (106) defines a first sub-frame (160), a second sub-frame (161), a third sub-frame (180), and a fourth sub-frame (181) for the image frame. As such, the first sub-frame (160), the second sub-frame (161), the third sub-frame (180), and the fourth sub-frame (181) each comprise a data array of a subset of the image data for the corresponding image frame.

The first image sub-frame (160) is displayed in a first image sub-frame location (185). The second image sub-frame (161) is displayed in a second image sub-frame location (186) that is offset from the first sub-frame location (185) by a vertical distance (163) and a horizontal distance (164). The third sub-frame (180) is displayed in a third image sub-frame location (187) that is offset from the first sub-frame location (185) by a horizontal distance (182). The horizontal distance (182) may be, for example, the same distance as the horizontal distance (164). The fourth sub-frame (181) is displayed in a fourth image sub-frame location (188) that is offset from the first sub-frame location (185) by a vertical distance (183). The vertical distance (183) may be, for example, the same distance as the vertical distance (163). As such, the second sub-frame (161), the third sub-frame (180), and the fourth sub-frame (181) are each spatially offset from each other and spatially offset from the first sub-frame (160) by a predetermined distance. In one illustrative embodiment, the vertical distance (163), the horizontal distance (164), the horizontal distance (182), and the vertical distance (183) are each approximately one-half of one pixel. However, the spatial offset distance between the four sub-frames may vary as best serves a particular application. In one embodiment, the wobbling device (104; FIG. 5) is configured to offset the beam of light between the SLM (103; FIG. 5) and the display optics (105; FIG. 5) such that the first, second, third, and fourth sub-frames (160, 161, 180, 181; FIG. 6) are spatially offset from each other.

In one embodiment, the display system (100; FIG. 5) completes one cycle of displaying the first sub-frame (160) in the first image sub-frame location (185), displaying the second sub-frame (161) in the second image sub-frame location (186), displaying the third sub-frame (180) in the third image sub-frame location (187), and displaying the fourth sub-frame (181) in the fourth image sub-frame location (188) resulting in a displayed image with an enhanced apparent resolution. Thus, the displays of the second sub-frame (161), the third sub-frame (180), and the fourth sub-frame (181) are spatially and temporally displaced relative to each other and relative to first sub-frame (160).

Figure 9A:
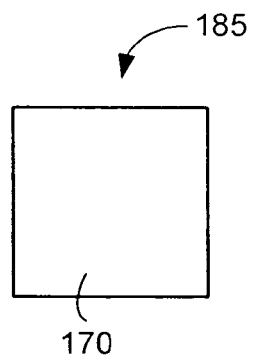
FIGS. 9A-D illustrate displaying a pixel from the first sub-frame in a first image sub-frame location, displaying a pixel from the second sub-frame in a second image sub-frame location, displaying a pixel from the third sub-frame in a third image sub-frame location, and displaying a pixel from the fourth sub-frame in a fourth image sub-frame location according to one exemplary embodiment.
Figure 9B:
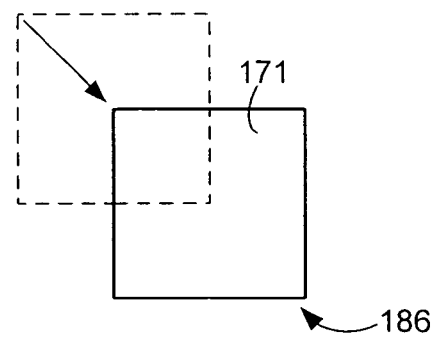
Figure 9C:
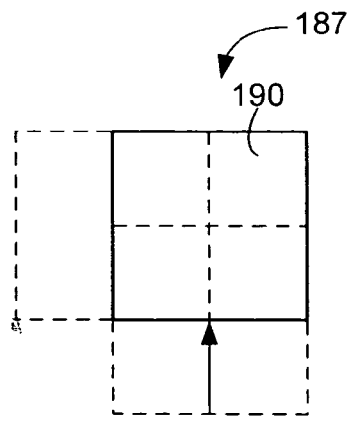
Figure 9D:
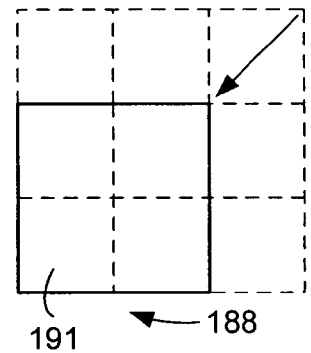

FIGS. 9A-D illustrate an exemplary embodiment of completing one cycle of displaying a pixel (170) from the first sub-frame (160) in the first image sub-frame location (185), displaying a pixel (171) from the second sub-frame (161) in the second image sub-frame location (186), displaying a pixel (190) from the third sub-frame (180) in the third image sub-frame location (187), and displaying a pixel (191) from the fourth sub-frame (170) in the fourth image sub-frame location (188). FIG. 9A illustrates the display of the pixel (170) from the first sub-frame (160) in the first image sub-frame location (185). FIG. 9B illustrates the display of the pixel (171) from the second sub-frame (161) in the second image sub-frame location (186) (with the first image sub-frame location being illustrated by dashed lines). FIG. 9C illustrates the display of the pixel (190) from the third sub-frame (180) in the third image sub-frame location (187) (with the first image sub-frame location and the second image sub-frame location being illustrated by dashed lines). Finally, FIG. 9D illustrates the display of the pixel (191) from the fourth sub-frame (170) in the fourth image sub-frame location (188) (with the first image sub-frame location, the second image sub-frame location, and the third image sub-frame location being illustrated by dashed lines).

Thus, by generating four image sub-frames and displaying the four sub-frames in the spatially offset manner as illustrated in FIGS. 8A-D and FIGS. 9A-D, four times the amount of pixel data is used to create the finally displayed image as compared to the amount of pixel data used to create a finally displayed image without using the image sub-frames. Accordingly, with four-position processing, the resolution of the finally displayed image is increased by a factor of two or the square root of four.

Thus, as shown by the examples in FIGS. 6-9, by generating a number of image sub-frames for an image frame and spatially and temporally displacing the image sub-frames relative to each other, the display system (100; FIG. 5) can produce a displayed image with a resolution greater than that which the SLM (103; FIG. 5) is configured to display. In one illustrative embodiment, for example, with image data having a resolution of 800 pixels by 600 pixels and the SLM (103; FIG. 5) having a resolution of 800 pixels by 600 pixels, four-position processing by the display system (100; FIG. 5) with resolution adjustment of the image data produces a displayed image with a resolution of 1600 pixels by 1200 pixels.

In addition, by overlapping pixels of image sub-frames, the display system (100; FIG. 5) may reduce the undesirable visual effects caused, for example, by a defective pixel. For example, if four sub-frames are generated by the sub-frame generation function (152; FIG. 5) and displayed in offset positions relative to each other, the four sub-frames effectively diffuse the undesirable effect of the defective pixel because a different portion of the image that is to be displayed is associated with the defective pixel in each sub-frame. A defective pixel is defined to include an aberrant or inoperative display pixel such as a pixel which exhibits only an "on" or "off" position, a pixel which produces less intensity or more intensity than intended, and/or a pixel with inconsistent or random operation.

Returning to FIG. 5, in one embodiment, the image processing unit (106) includes a system timing unit (154). In an alternative embodiment, the system timing unit (154) is a separate component of the display system (100) and is not integrated into the image processing unit (106). However, for explanatory purposes, the exemplary display system (100) of FIG. 5 will be described with a system timing unit (154) that is integrated into the image processing unit (106). The system timing unit (154) communicates, for example, with the frame rate conversion unit (150), the resolution adjustment function (151), the sub-frame generation function (152), the scrolling color device (102), the SLM (103), and the wobbling device (104). In an exemplary embodiment, the system timing unit (154) synchronizes the buffering and conversion of the image data to create an image frame, the processing of the image frame to adjust the resolution of the image data to the resolution of display system (100), the generation of the sub-frames, the modulation of the image sub-frames, and the display and positioning of the image sub-frames. Accordingly, the system timing unit (154) controls the timing of display system (100) such that an entire group of image sub-frames are temporally and spatially displayed in different positions by the display optics (105) in a manner that correctly displays the finally displayed image.

Figure 10:
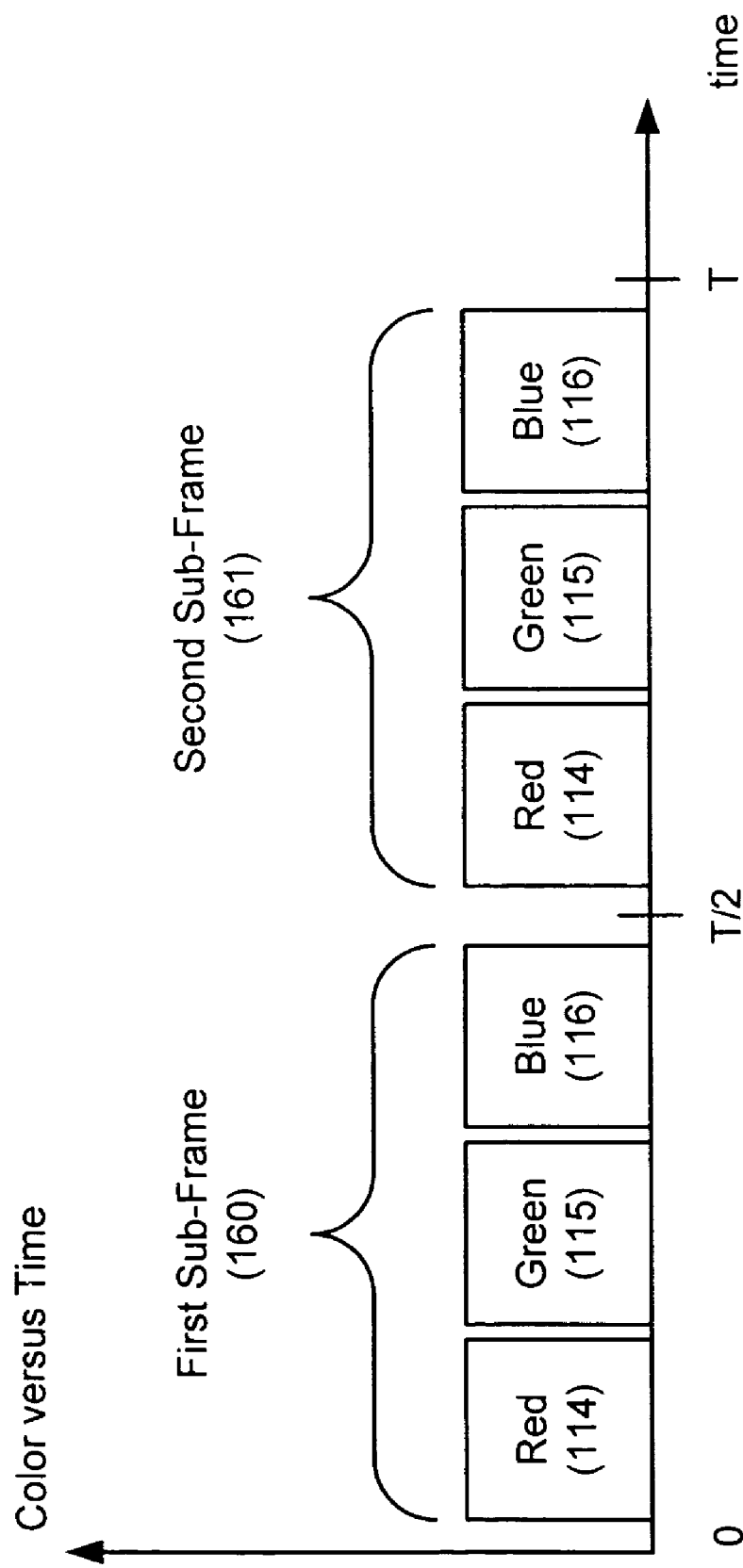
FIG. 10 illustrates an exemplary synchronization of the scrolling color device and the wobbling device to facilitate scrolling color, resolution enhancement, and pixel error hiding in the same display system according to one exemplary embodiment.

FIG. 10 illustrates an exemplary synchronization of the scrolling color device (102; FIG. 5) and the wobbling device (104; FIG. 5) to facilitate scrolling color, resolution enhancement, and pixel error hiding in the same display system (100; FIG. 5) according to one exemplary embodiment. FIG. 10 shows the color of a single pixel at different times in an image frame period, T. As shown in FIG. 10, a number of image sub-frames corresponding to a particular image frame are displayed within the image frame period, T. In other words, a number of images defined by the number of image sub-frames are displayed during the image frame period, T. The images defined by the image sub-frames will be referred to as "sub-frame images" hereafter and in the appended claims.

The image frame period T is the amount of time required to display all of the frame's corresponding image sub-frames. In the illustrative embodiment of FIG. 10, there are two image sub-frames generated by the sub-frame generation function (152; FIG. 5)—a first sub-frame (160) and a second sub-frame (161). As explained in connection with FIGS. 6A-C, it will be understood that two image sub-frames are an exemplary number of image sub-frames that may be generated by the sub-frame generation function (152) and that any number of image sub-frames for a frame may be generated as desired.

As shown in FIG. 10, the first image sub-frame (160) is displayed between times 0 and T/2 and the second image sub-frame (161) is displayed between times T/2 and T. Thus, an image sub-frame period, or time period, is T/2 where two image sub-frames are generated and displayed for one frame. However, if there are more than two image sub-frames generated and displayed per frame, the image sub-frame period will vary accordingly. In one embodiment, full color spectrum or complete color sub-frames occur an integer number of times during each image frame period, T. In other words, the scrolling color device (102; FIG. 5) may be configured to scroll through each color once during each image sub-frame period, T/2, resulting in complete color sub-frames. The time required to scroll through each color once will be referred to herein and in the appended claims as a "scrolling color period." For example, FIG. 10 shows that the scrolling color device (102; FIG. 5) is configured to cycle through the primary colors red (114), green (115), and blue (116) one time during the first sub-frame (160) period and one time during the second sub-frame (161) period. As will be understood by one skilled in the art, the order in which the primary colors red (114), green (115), and blue (116) are scrolled across a particular pixel may vary as best serves a particular application.

In one embodiment, the image frame period, T, and the corresponding image sub-frame periods also represent the time required for the SLM (103; FIG. 5) to modulate light bearing image sub-frames corresponding to an image frame.

Figure 11:
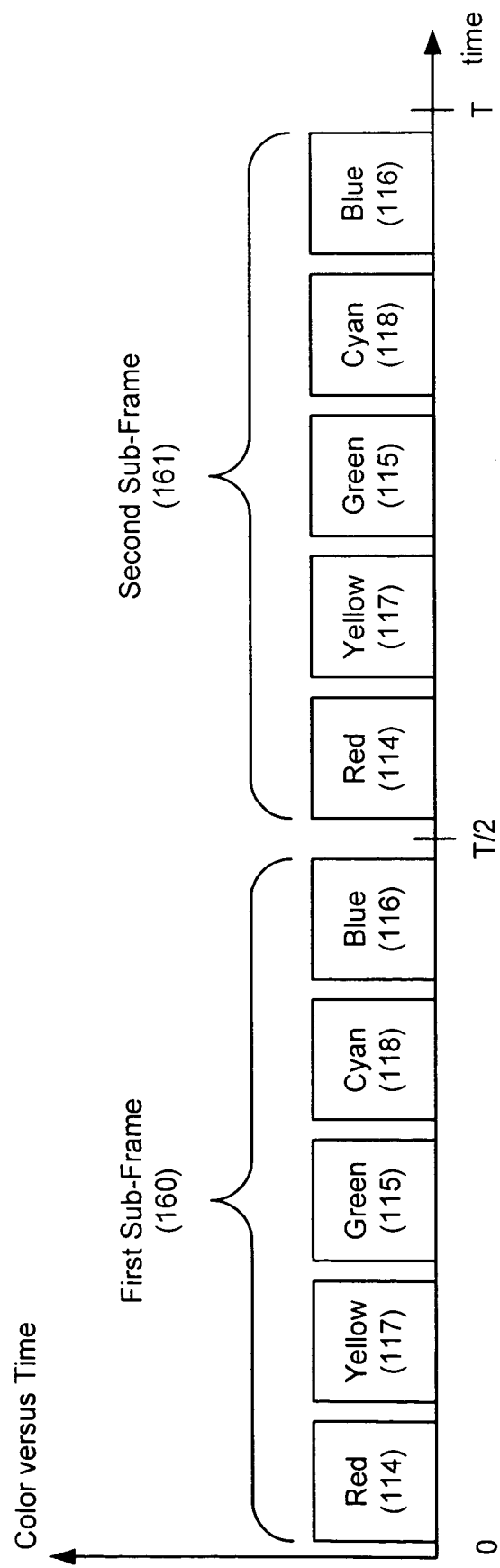
FIG. 11 illustrates that the scrolling color device may be configured to generate five colors instead of the three primary colors according to one exemplary embodiment.

As will be understood by one skilled in the art, each particular pixel may have a different sequence of colors focused thereon at any given time, depending on its position in the SLM (103; FIG. 5). Furthermore, the number of different colors that may be scrolled across a particular pixel during each image sub-frame period may be any number. For example, as shown in FIG. 11, the scrolling color device (102; FIG. 5) maybe configured to generate five colors instead of the three primary colors. The five colors may be, for example, red (114), yellow (117), green (115), cyan (118), and blue (116) in any order. In this case, as shown in FIG. 11, the scrolling color device (102; FIG. 5) is configured to cycle through the five colors one time during the first sub-frame (160) period and one time during the second sub-frame (161) period.

Figure 12:
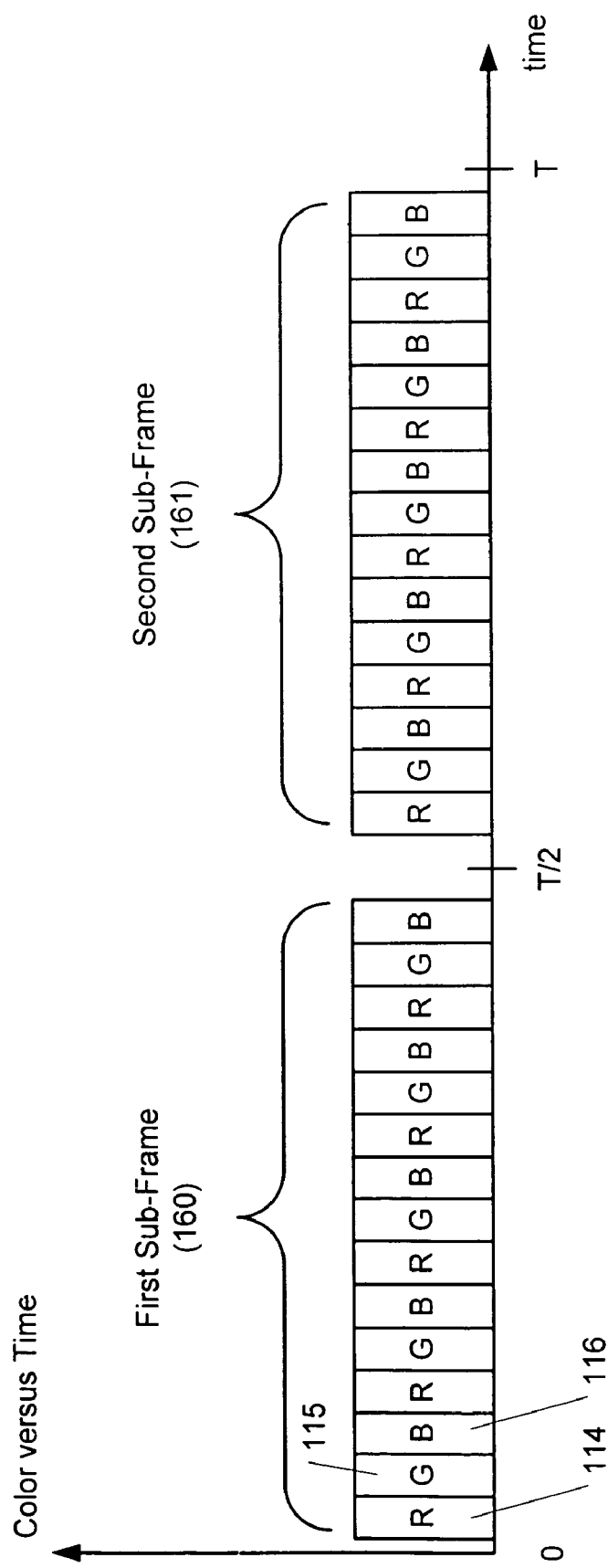
FIG. 12 illustrates that the colors produced by the scrolling color device may be scrolled across a given pixel a plurality of times during a particular image sub-frame period according to one exemplary embodiment.

In an alternative embodiment, the colors produced by the scrolling color device (102; FIG. 5) may be scrolled across a given pixel a plurality of times during a particular image sub-frame period. For example, as shown in FIG. 12, the scrolling color device (102; FIG. 5) cycles through the primary colors red (114), green (115), and blue (116) in any order five times during the first sub-frame (160) period and five times during the second sub-frame (161) period. The number of times the scrolling color device (102; FIG. 5) scrolls through each of the colors during a particular sub-frame period may vary and be any number as best serves a particular application. The embodiment described in connection with FIG. 12 may be used in, but is not limited to, display systems that provide very rapidly scrolling color. Furthermore, the embodiment described in connection with FIG. 12 may be implemented in a display system with a scrolling color device that scrolls any number of different colors.

In one embodiment, the system timing unit (154; FIG. 5) synchronizes the scrolling color device (102; FIG. 5) and the wobbling device (104; FIG. 5) such that one or more full color spectrums are displayed during a given image sub-frame period as described in connection with FIGS. 10-12. Without synchronization, the scrolling device may undesirably scroll an incomplete color spectrum across the modulator (103; FIG. 5) during a particular sub-frame period. The system timing unit (154; FIG. 5) may employ various techniques to accomplish the synchronization. For example, a feedback control loop may be used to perform the synchronization. Other synchronization techniques may be used as best serves a particular application.

Figure 13:
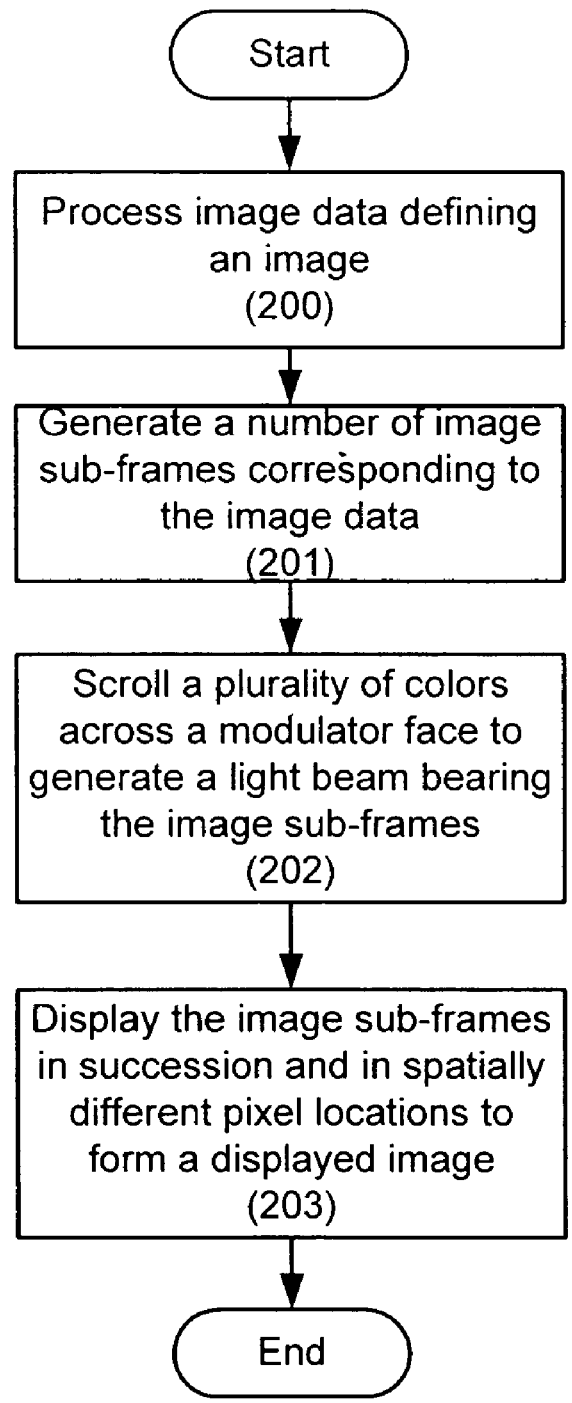
FIG. 13 is a flow chart illustrating an exemplary method for displaying an image according to one exemplary embodiment.

FIG. 13 is a flow chart illustrating an exemplary method for displaying an image according to one exemplary embodiment. First, image data defining an image is processed (step 200). Next, a number of image sub-frames corresponding to the image data are generated (step 201). A plurality of colors is then scrolled across a modulator face to generate a light beam bearing the image sub-frames (step 202). The image sub-frames are then displayed sequentially in spatially different locations from one another to form a displayed image (step 203).

Figure 14:
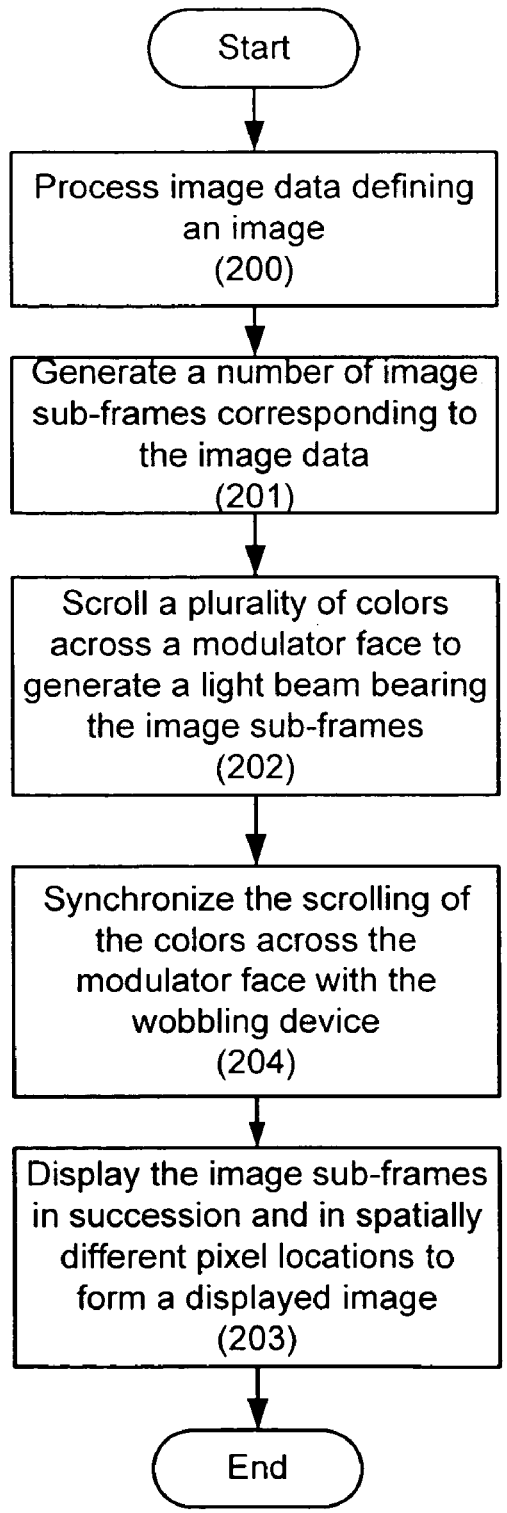
FIG. 14 is a flow chart illustrating an exemplary method for displaying an image with an additional step of synchronizing the scrolling of the plurality of colors across the modulator face with the wobbling device according to one exemplary embodiment.

Additional steps to those shown in FIG. 13 may be implemented in the exemplary method. In one embodiment, as shown in FIG. 14, an additional step of synchronizing the scrolling of the plurality of colors across the modulator face with the wobbling device (104; FIG. 5) (step 204) may be included as part of an exemplary method for displaying an image. The synchronization may be performed such that one or more full color spectrums are displayed during a given image sub-frame period as previously explained.

The preceding description has been presented only to illustrate and describe embodiments of invention. It is not intended to be exhaustive or to limit the invention to any precise form disclosed. Many modifications and variations are possible in light of the above teaching. It is intended that the scope of the invention be defined by the following claims.

What is claimed is:

1. A display system for displaying an image, comprising:
    an image processing unit configured to process image data and generate a number of image sub-frames corresponding to said image data;
    a modulator configured to modulate a light beam according to said image sub-frames;
    a scrolling color device configured to scroll a plurality of colors across a face of said modulator, wherein all of said plurality of colors are present simultaneously on said face of said modulator, to produce a color light beam bearing said number of image sub-frames;
    display optics configured to display said image from said color light beam; and
    a wobbling device configured to displace said color light beam according to a cycle in which said image sub-frames are sequentially displayed in a cycle of spatially offset positions, said spatially offset positions being offset by less than a pixel width from each other;
    wherein said scrolling color device scrolls said plurality of colors across said face of said modulator an integer number of times during an image sub-frame time period corresponding to said each of said number of image sub-frames; and
    further comprising a system timing unit configured to synchronize said scrolling color device and said wobbling device such that said scrolling color device scrolls said plurality of colors across said face of said modulator an integer number of times during an image sub-frame time period corresponding to each of said number of image sub-frames.

2. The system of claim 1, wherein said integer number of times said scrolling color device scrolls said plurality of colors across said face of said modulator during an image sub-frame time period is one.

3. The system of claim 1, wherein said system timing unit is integrated into said image processing unit.

4. The system of claim 1, wherein said number of image sub-frames comprises a first image sub-frame and a second image sub-frame.

5. The system of claim 1, wherein said offset distance comprises a vertical offset distance and a horizontal offset distance.

6. The system of claim 5, wherein said vertical offset distance and said horizontal offset distance are substantially equal to one-half of a pixel.

7. The system of claim 1, wherein said number of image sub-frames comprises:
    a first image sub-frame;
    a second image sub-frame;
    a third image sub-frame; and
    a fourth image sub-frame.

8. The system of claim 7, wherein said wobbling device is further configured to displace said color light beam such that:
    said second image sub-frame is displayed in a second image sub-frame location offset by a first offset distance from a first image sub-frame location of said first image sub-frame;
    said third image sub-frame is displayed in a third image sub-frame location offset by a second offset distance from said second image sub-frame location of said second image sub-frame; and
    said fourth image sub-frame is displayed in a fourth image sub-frame location offset by a third offset distance from said third image sub-frame location of said third image sub-frame.

9. The system of claim 8, wherein:
    said first offset distance comprises a vertical offset distance and a horizontal offset distance, said second image sub-frame location being vertically offset from said first image sub-frame location by said vertical offset distance and horizontally offset from said first image sub-frame location by said horizontal offset distance;
    said second offset distance comprises said vertical offset distance, said third image sub-frame location being vertically offset by said vertical offset distance from said second image sub-frame location; and
    said third offset distance comprises said vertical offset distance and said horizontal offset distance, said fourth image sub-frame location being vertically offset from said third image sub-frame location by said vertical offset distance and horizontally offset from said third image sub-frame location by said horizontal offset distance.

10. The system of claim 9, wherein said vertical offset distance and said horizontal offset distance are substantially equal to one-half of a pixel.

11. The system of claim 7, wherein said scrolling color device scrolls said plurality of colors across said face of said modulator an integer number of times during a first image sub-frame time period corresponding to said first image sub-frame, during a second image sub-frame time period corresponding to said second image sub-frame, during a third image sub-frame time period corresponding to said third image sub-frame, and during a fourth image sub-frame time period corresponding to said fourth image sub-frame.

12. The system of claim 1, wherein said image processing unit comprises a sub-frame generation function configured to generate said number of image sub-frames.

13. The system of claim 1, wherein said wobbling device comprises a galvanometer mirror.

14. The system of claim 1, wherein said scrolling color device comprises rotating prisms.

15. The system of claim 1, wherein said scrolling color device comprises a color wheel.

16. The system of claim 1, wherein said plurality of colors comprises red, green, and blue.

17. The system of claim 1, wherein said plurality of colors comprises red, yellow, green, cyan, and blue.

18. A method of displaying an image, said method comprising:

processing image data defining said image and generating a number of image sub-frames corresponding to said image data;

generating a light beam bearing said number of image sub-frames with a modulator;

scrolling a plurality of primary colors across a face of said modulator during said generation of said light beam such that said light beam comprises a color light beam bearing said number of image sub-frames, wherein a band of each of said primary colors is incident simultaneously on said face of said modulator during said scrolling;

displaying said color light beam to form said image;

displacing said color light beam such that each of said number of image sub-frames is sequentially displayed in one of a cycle of image sub-frame locations, each of which is spatially offset from others of said image sub-frame locations; and synchronizing said scrolling of said plurality of primary colors across said face of said modulator with said displacing of said color light beam such that said plurality of colors scroll across said face of said modulator an integer number of times during an image sub-frame time period corresponding to each of said number of image sub-frames.

19. The method of claim 18, wherein said integer number of times is one.

20. The method of claim 18, wherein said number of image sub-frames comprises a first image sub-frame and a second image sub-frame.

21. The method of claim 20, wherein said step of displacing said color light beam further comprises displacing said color light beam such that said second image sub-frame is displayed in a second image sub-frame location offset by an offset distance from a first image sub-frame location of said first image sub-frame.

22. The method of claim 21, wherein said offset distance comprises a vertical offset distance and a horizontal offset distance, said second image sub-frame location being vertically offset from said first image sub-frame location by said vertical offset distance and horizontally offset from said first image sub-frame location by said horizontal offset distance.

23. The method of claim 22, wherein said vertical offset distance and said horizontal offset distance are substantially equal to one-half of a pixel.

24. The method of claim 18, wherein said number of image sub-frames comprises:

a first image sub-frame;

a second image sub-frame;

a third image sub-frame; and a fourth image sub-frame.

25. The method of claim 24, wherein said step of displacing said color light beam further comprises displacing said color light beam such that:

said second image sub-frame is displayed in a second image sub-frame location offset by a first offset distance from a first image sub-frame location of said first image sub-frame;

said third image sub-frame is displayed in a third image sub-frame location offset by a second offset distance from said second image sub-frame location of said second image sub-frame; and said fourth image sub-frame is displayed in a fourth image sub-frame location offset by a third offset distance from said third image sub-frame location of said third image sub-frame.

* * * * *

UNITED STATES PATENT AND TRADEMARK OFFICE
CERTIFICATE OF CORRECTION

| | | |
|---|---|---|
| PATENT NO. | : 7,358,930 B2 | Page 1 of 1 |
| APPLICATION NO. | : 10/686110 | |
| DATED | : April 15, 2008 | |
| INVENTOR(S) | : Winthrop D. Childers | |

It is certified that error appears in the above-identified patent and that said Letters Patent is hereby corrected as shown below:

On the title page, item (56), under "U.S. Patent Documents", in column 2, line 8, delete "2002/0135662 A1" and insert -- 2002/135862 A1 --, therefor.

Signed and Sealed this

Twenty-third Day of September, 2008

JON W. DUDAS
*Director of the United States Patent and Trademark Office*